(12) United States Patent
Oishi et al.

(10) Patent No.: US 11,252,380 B2
(45) Date of Patent: Feb. 15, 2022

(54) ROAD MANAGEMENT SYSTEM

(71) Applicant: HONDA MOTOR CO., LTD., Tokyo (JP)

(72) Inventors: Yasuo Oishi, Tokyo (JP); Kazuya Matsuura, Tokyo (JP); Atsuki Kakinuma, Tokyo (JP); Takeo Tokunaga, Tokyo (JP); Akira Iihoshi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/800,685

(22) Filed: Feb. 25, 2020

(65) Prior Publication Data

US 2020/0275061 A1    Aug. 27, 2020

(30) Foreign Application Priority Data

Feb. 26, 2019   (JP) .............................. JP2019-032474

(51) Int. Cl.

| H04N 7/18 | (2006.01) |
|---|---|
| B60R 11/04 | (2006.01) |
| B60R 21/013 | (2006.01) |
| G06K 9/00 | (2006.01) |
| G08G 1/0967 | (2006.01) |
| G01N 21/88 | (2006.01) |
| G08G 1/16 | (2006.01) |

(52) U.S. Cl.
CPC ............. *H04N 7/188* (2013.01); *B60R 11/04* (2013.01); *B60R 21/013* (2013.01); *G06K 9/00791* (2013.01); *G06K 9/00805* (2013.01); *G08G 1/0967* (2013.01); *H04N 7/183* (2013.01); *G08G 1/165* (2013.01); *G08G 1/166* (2013.01)

(58) Field of Classification Search
None
See application file for complete search history.

(56) References Cited

U.S. PATENT DOCUMENTS

| 2010/0235035 | A1* | 9/2010 | Nishira | ................... G08G 1/165 |
|---|---|---|---|---|
| | | | | 701/31.4 |
| 2013/0151058 | A1* | 6/2013 | Zagorski | ........... B60W 30/0956 |
| | | | | 701/23 |
| 2014/0229069 | A1* | 8/2014 | Akiyama | ............... B60W 10/18 |
| | | | | 701/41 |
| 2016/0217333 | A1* | 7/2016 | Ozawa | .................... G08G 1/164 |
| 2017/0168503 | A1* | 6/2017 | Amla | ................... G05D 1/0011 |
| 2017/0291608 | A1* | 10/2017 | Engel | ............... G08G 1/096741 |

(Continued)

FOREIGN PATENT DOCUMENTS

| JP | 5853719 B2 | 2/2016 | |
|---|---|---|---|
| JP | 2018171959 A | * 11/2018 | .......... B60W 30/165 |

*Primary Examiner* — Mohammed Jebari
(74) *Attorney, Agent, or Firm* — Carrier Blackman & Associates, P.C.; Joseph P. Carrier; William D. Blackman (57) ABSTRACT

A road management system includes: an avoiding action detecting section that detects an avoiding action of a moving body (a vehicle, a first vehicle) moving along a road; a position detecting section that detects a position of the moving body (the vehicle, the first vehicle); an avoidance position determining section that determines an avoidance position where the avoiding action has occurred, based on a detection result of the avoiding action detecting section and a detection result of the position detecting section; and an imaging section that images a road surface of the avoidance position.

8 Claims, 11 Drawing Sheets

(56) References Cited

U.S. PATENT DOCUMENTS

2018/0032082 A1\* 2/2018 Shalev-Shwartz .... B60W 30/09
2018/0107946 A1\* 4/2018 Yamamoto ............. G06N 20/00
2018/0165966 A1\* 6/2018 Ishikawa ............... B60W 50/14
2019/0256088 A1\* 8/2019 Sharma ................. B60W 50/14
2020/0166360 A1\* 5/2020 Jaganathan .......... G08G 1/0141

\* cited by examiner

ROAD MANAGEMENT SYSTEM

CROSS-REFERENCE TO RELATED APPLICATION

This application is based upon and claims the benefit of priority from Japanese Patent Application No. 2019-032474 filed on Feb. 26, 2019, the contents of which are incorporated herein by reference.

BACKGROUND OF THE INVENTION

Field of the Invention

The present invention relates to a road management system that acquires an image of a road surface.

Description of the Related Art

Japanese Patent No. 5853719 discloses: an image processing system that detects a state (a dry state or a frozen state) of a road surface and utilizes the detected state for such objects as calling attention of a driver to the detected state; and a vehicle comprising the image processing system.

SUMMARY OF THE INVENTION

In the case of using the system of Japanese Patent No. 5853719 with an object of analyzing an abnormality unexpectedly present in the road surface, it is required that analysis of the road surface is performed continuously, regardless of presence/absence of an abnormality. Therefore, a load of arithmetic processing increases.

The present invention, which was made considering such a problem, has an object of providing a road management system that can suppress a load of arithmetic processing when performing analysis of a road surface.

An aspect of the present invention comprises:
an avoiding action detecting section configured to detect an avoiding action of a moving body moving along a road;
a position detecting section configured to detect a position of the moving body;
an avoidance position determining section configured to determine an avoidance position where the avoiding action has occurred, based on a detection result of the avoiding action detecting section and a detection result of the position detecting section; and
an imaging section configured to image a road surface of the avoidance position.

According to the present invention, the load of arithmetic processing when performing analysis of the road surface can be suppressed.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a road management system according to the present invention will be presented and described in detail below with reference to the accompanying drawings.

1. First Embodiment

Figure 1:
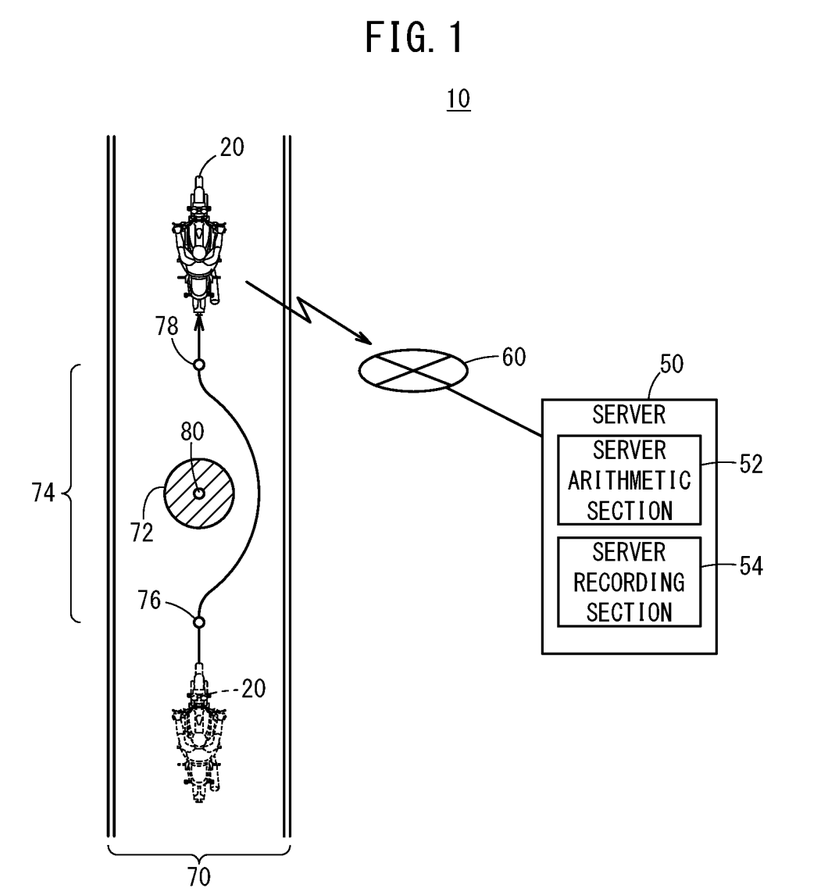
FIG. 1 is a schematic view of a road management system according to a first embodiment.

As shown in FIG. 1, in a road management system 10 according to a first embodiment, when an avoiding action has been performed by a vehicle 20 (a moving body) moving along a road 70, an image of an avoidance position 74 is transmitted to a server 50 from that vehicle 20. Here, a two-wheeled vehicle is assumed as a kind of the vehicle 20. However, the kind of the vehicle 20 may be a four-wheeled vehicle, not a two-wheeled vehicle.

The server 50 is a computer and includes a server arithmetic section 52 and a server recording section 54. The server arithmetic section 52 is configured by a processor comprising the likes of a CPU, for example. The server arithmetic section 52 realizes various kinds of functions by executing a program recorded in the server recording section 54. The server recording section 54 is configured by a RAM, a ROM, or the like.

[1.1 Configuration of Vehicle 20]

Figure 2:
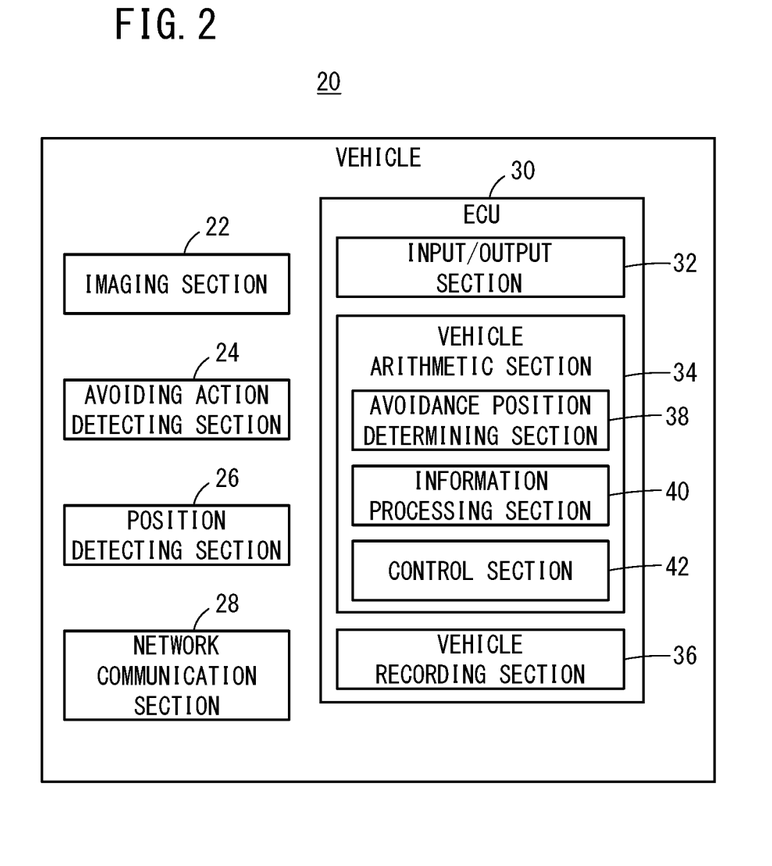
FIG. 2 is a configuration diagram of a vehicle in the first embodiment.

A configuration of the vehicle 20 will be described using FIG. 2. The vehicle 20 includes an imaging section 22, an avoiding action detecting section 24, a position detecting section 26, a network communication section 28, and an ECU 30.

The imaging section 22 includes at least one camera, and images a road surface in front of the vehicle 20. The imaging section 22 outputs an image of the road surface to the ECU 30. The avoiding action detecting section 24 includes the likes of a gyro sensor or steering angle sensor, for example, and detects a turning action and an avoiding action performed by the vehicle 20 on the road 70. In the present specification, an avoiding action refers to consecutive turning actions to right and left performed by the vehicle 20 within a certain time or within a certain distance. The avoiding action detecting section 24 outputs detected information to the ECU 30. The position detecting section 26 is a navigation device that includes, for example, map information, a GNSS module, an acceleration sensor, a gyro sensor, and so on, and detects a position of the vehicle 20 using at least one of satellite navigation and inertial navigation. The position detecting section 26 outputs detected information to the ECU 30.

The network communication section 28 transmits to the server 50 via a public line 60 information generated by a vehicle arithmetic section 34 or information recorded in a vehicle recording section 36, and, moreover, receives information transmitted via the public line 60 from the server 50, and outputs the received information to the vehicle arithmetic section 34 or the vehicle recording section 36.

The ECU 30 includes an input/output section 32, the vehicle arithmetic section 34, and the vehicle recording section 36. The input/output section 32 is configured by an A/D converter circuit, a communication interface, a driver, and so on. The vehicle arithmetic section 34 is configured by a processor comprising the likes of a CPU, for example. The vehicle arithmetic section 34 realizes various kinds of functions by executing a program recorded in the vehicle recording section 36. Here, the vehicle arithmetic section 34 functions as an avoidance position determining section 38, an information processing section 40, and a control section 42. The avoidance position determining section 38 determines a position where the avoiding action has occurred (hereafter called the avoidance position 74), based on a detection result of the avoiding action detecting section 24 and a detection result of the position detecting section 26. The information processing section 40 associates image information and position information, and records the associated image information and position information in the vehicle recording section 36. The control section 42 controls various kinds of instruments. The vehicle recording section 36 is configured by a RAM, a ROM, or the like. The vehicle recording section 36 records various kinds of programs, and various kinds of information used in processing performed by the vehicle arithmetic section 34. Moreover, the vehicle recording section 36 records associated with each other the position information and image information from a latest time to a predetermined time before. The position information and the image information may be associated with time information, for example, an imaging time of the image, or a road passing time.

[1.2 Processing]

Figure 3:
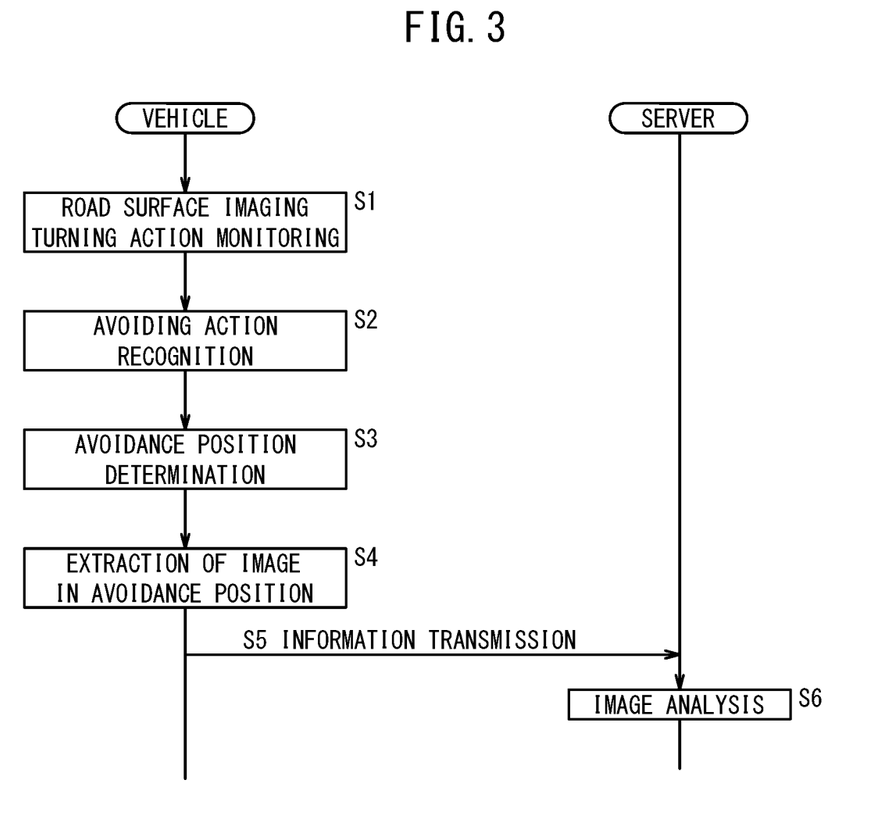
FIG. 3 is a sequence chart of the first embodiment.

Processing performed by the road management system 10 according to the first embodiment will be described using FIG. 3. The processing below is performed during running of the vehicle 20.

In step S1, the control section 42 controls the imaging section 22 to image the road surface. Thereafter, the imaging section 22 continues imaging. Moreover, the avoidance position determining section 38 monitors turning action of the vehicle 20 based on the detection result of the avoiding action detecting section 24. Now, the information processing section 40 associates image information of the road surface imaged by the imaging section 22 and position information detected by the position detecting section 26, and records the associated image information and position information in the vehicle recording section 36. Moreover, the information processing section 40 records, in the vehicle recording section 36, turning position information indicating a position where a turning action has been performed, based on information detected by the avoiding action detecting section 24 and position information detected by the position detecting section 26.

As shown in FIG. 1, when there is an abnormality, for example, a hole 72 (or an obstacle) in the road 70, the vehicle 20 performs an avoiding action avoiding the hole 72 before reaching the hole 72. At this time, the avoiding action detecting section 24 detects consecutive turning actions to right and left within a certain time or within a certain distance.

In step S2, the avoidance position determining section 38 recognizes that an avoiding action has been performed by the vehicle 20, based on the detection result of the avoiding action detecting section 24.

In step S3, the avoidance position determining section 38 determines the avoidance position 74 based on the turning position information recorded in the vehicle recording section 36. For example, the avoidance position determining section 38 may determine a start position 76 of the avoiding action, that is, an initial turning position in a section where the avoiding action has been performed, to be the avoidance position 74. Moreover, the avoidance position determining section 38 may determine an end position 78 of the avoiding action, that is, a final turning position in the section where the avoiding action has been performed, to be the avoidance position 74. Moreover, the avoidance position determining section 38 may determine an intermediate position 80 of the avoiding action, that is, an intermediate position between the start position 76 and the end position 78 of the avoiding action, to be the avoidance position 74. Moreover, the avoidance position determining section 38 may determine the whole or part of the section from the start position 76 to the end position 78 of the avoiding action, to be the avoidance position 74.

In step S4, the information processing section 40 extracts an image in the avoidance position 74. Now, the information processing section 40 extracts image information associated with position information of the avoidance position 74 from the image information recorded in the vehicle recording section 36 up to a predetermined time before.

In step S5, the control section 42 controls the network communication section 28 to transmit the image information of the road surface of the avoidance position 74 and the position information associated with that image information.

In step S6, the server 50 performs image analysis, based on the image information of the road surface of the avoidance position 74 transmitted from the vehicle 20, and specifies a kind of the abnormality. Due to this processing, the kind and position of the abnormality are specified.

2. Second Embodiment

Figure 4:
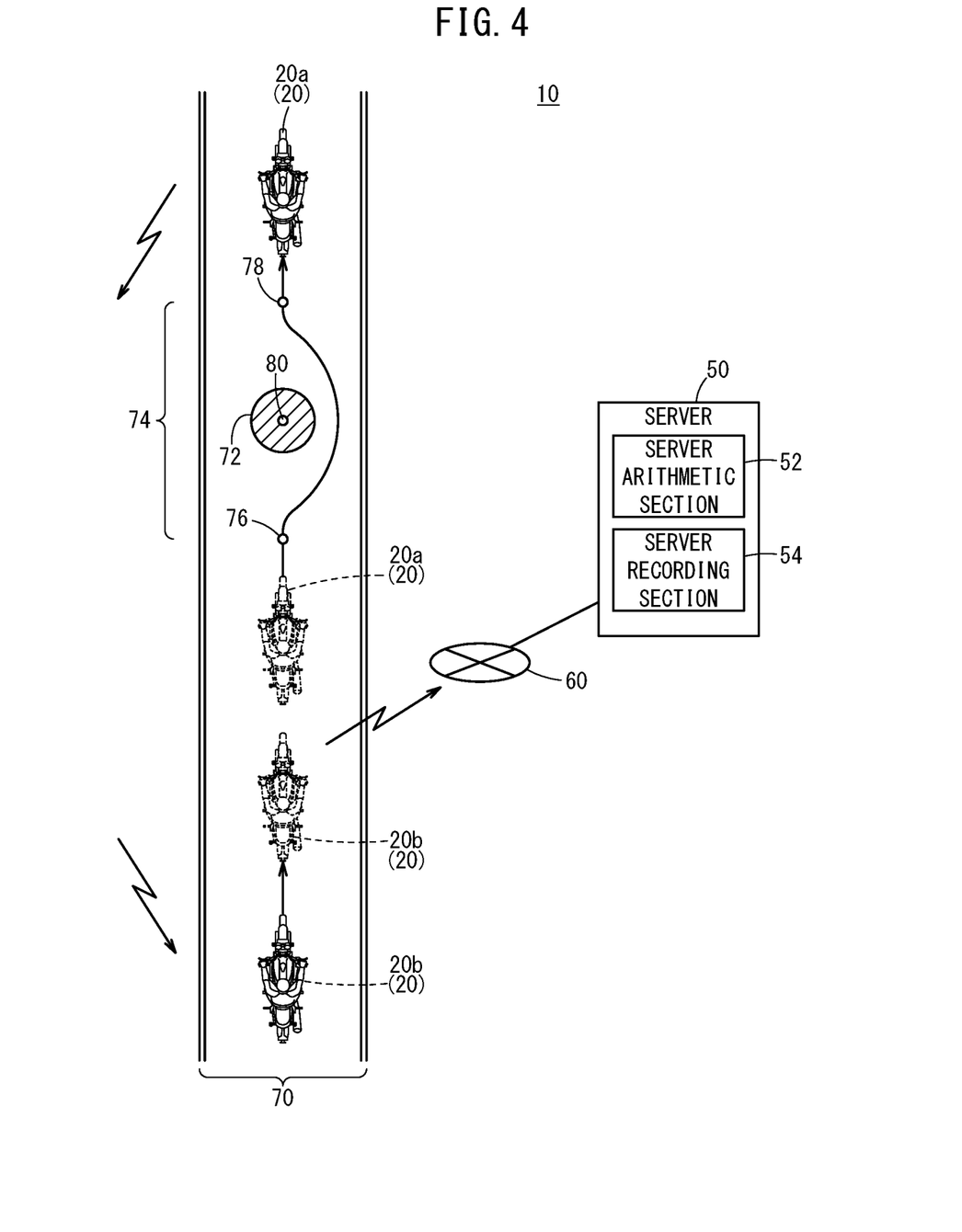
FIG. 4 is a schematic view of a road management system according to a second embodiment.

As shown in FIG. 4, in the road management system 10 according to a second embodiment, when an avoiding action has been performed by a first vehicle 20a (a first moving body) moving along the road 70, an image of the avoidance position 74 is transmitted to the server 50 from a second vehicle 20b (a second moving body) moving in the same direction as the first vehicle 20a and approaching the avoidance position 74. Here, a two-wheeled vehicle is assumed as a kind of the first vehicle 20a and a kind of the second vehicle 20b. However, the kind of the first vehicle 20a and the kind of the second vehicle 20b may be a four-wheeled vehicle, not a two-wheeled vehicle. Moreover, the kind of the first vehicle 20a and the kind of the second vehicle 20b may differ. A configuration of the server 50 is the same as the configuration of the server 50 in the first embodiment.

[2.1 Configurations of First Vehicle 20a and Second Vehicle 20b]

Figure 5:
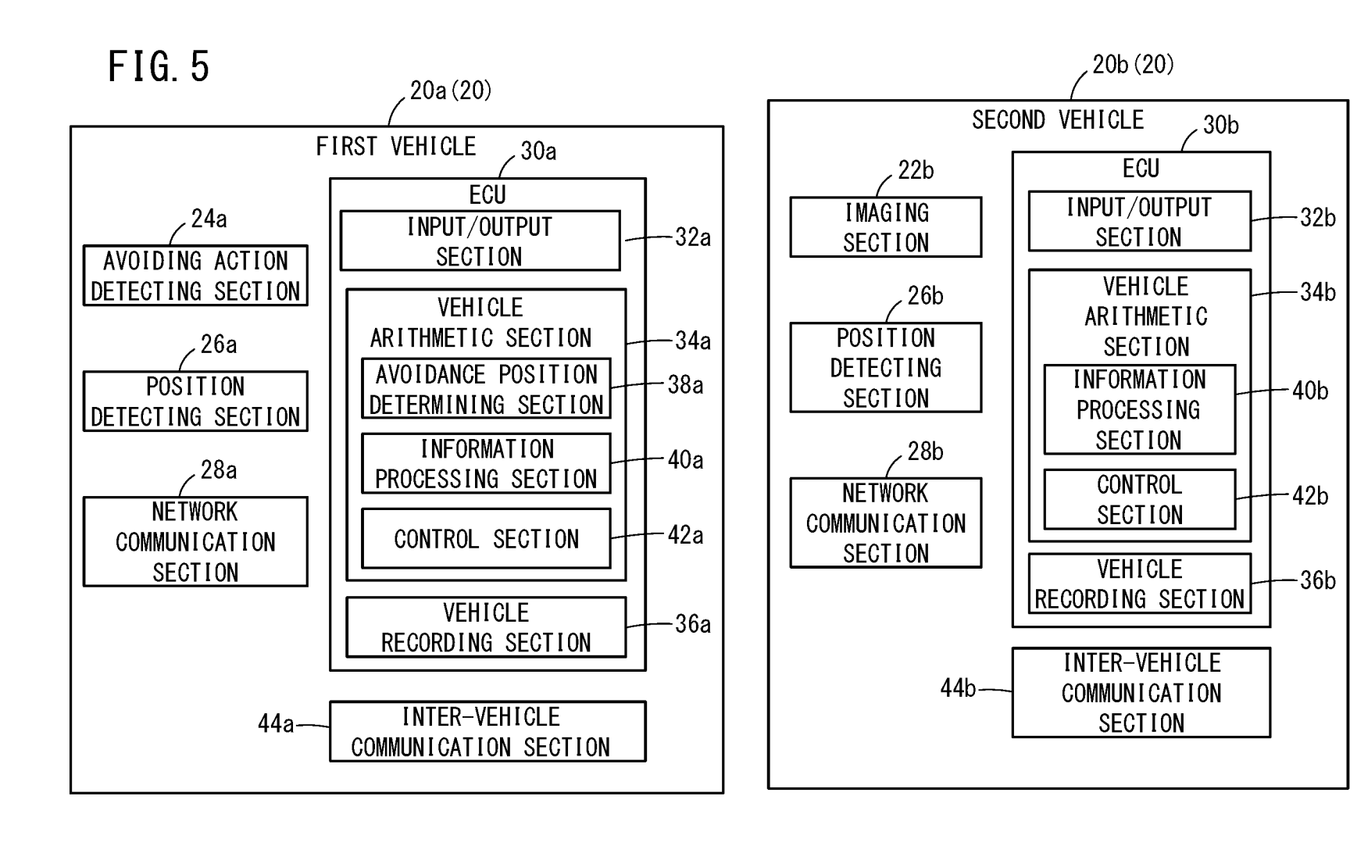
FIG. 5 is configuration diagram of a first vehicle and a second vehicle in the second and a third embodiment.

Configurations of the first vehicle 20a and the second vehicle 20b will be described using FIG. 5. The configurations of the first vehicle 20a and the second vehicle 20b are roughly the same as the configuration of the vehicle 20 in the first embodiment. In the description below, those configurations of the first vehicle 20a that are the same as the configurations of the vehicle 20 in the first embodiment, will be given the same names as in the first embodiment, and will be assigned with reference symbols adding 'a' to the reference symbols of the first embodiment. Similarly, those configurations of the second vehicle 20b that are the same as the configurations of the vehicle 20 in the first embodiment, will be given the same names as in the first embodiment, and will be assigned with reference symbols adding 'b' to the reference symbols of the first embodiment.

Unlike in the first embodiment, the vehicle 20 (the first vehicle 20a and the second vehicle 20b) of the second embodiment includes (include) inter-vehicle communication sections 44a, 44b. The inter-vehicle communication sections 44a, 44b each include a communication device and an antenna for performing inter-vehicle communication.

[2.2 Processing]

Figure 6:
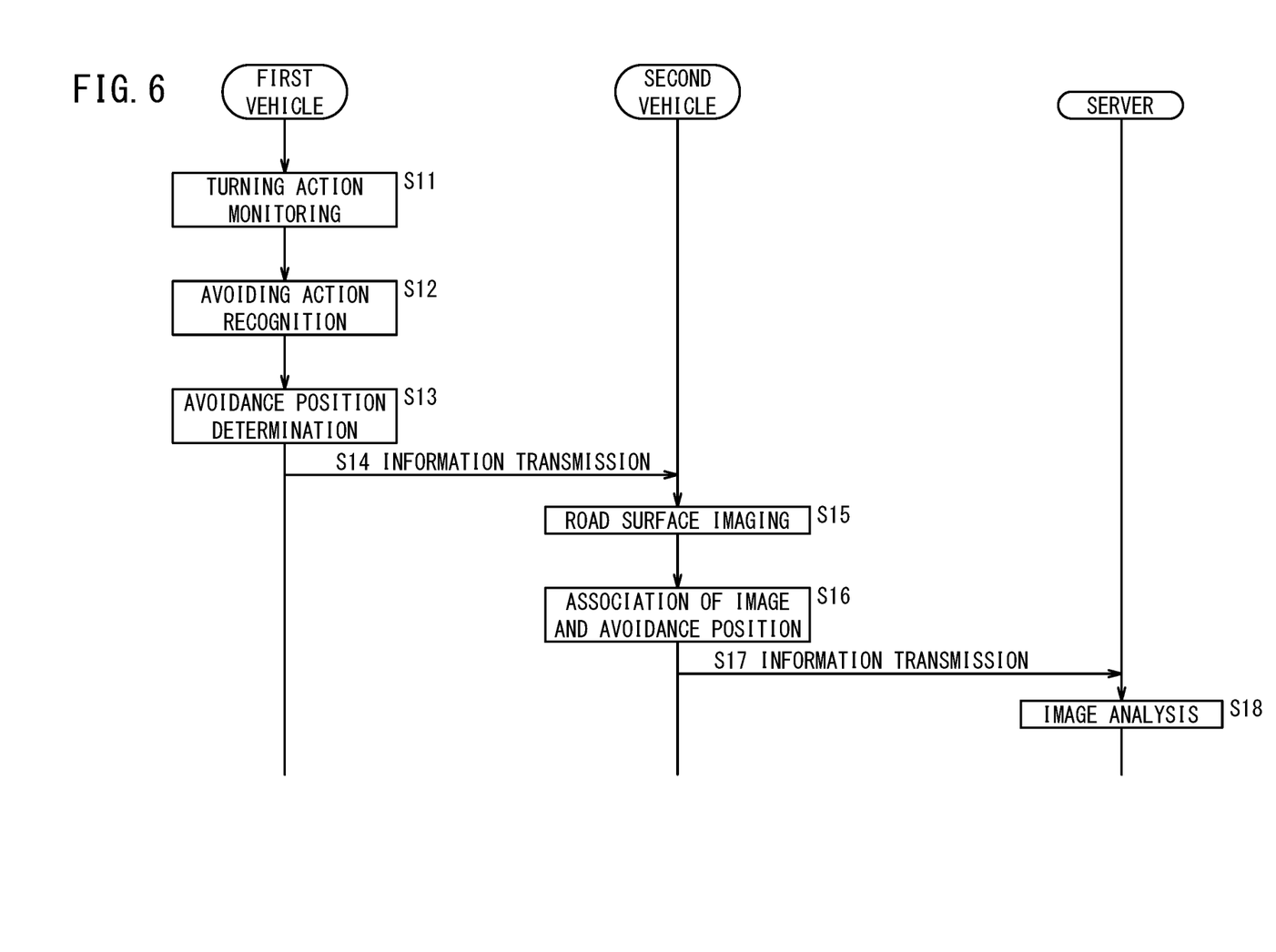
FIG. 6 is a sequence chart of the second and third embodiments.

Processing performed by the road management system 10 according to the second embodiment will be described using FIG. 6. The processing below is performed during running of the first vehicle 20a and the second vehicle 20b.

In step S11, an avoidance position determining section 38a of the first vehicle 20a monitors turning action of the first vehicle 20a based on the detection result of an avoiding action detecting section 24a. Now, an information processing section 40a records, in a vehicle recording section 36a, turning position information indicating the position where a turning action has been performed, based on the information detected by the avoiding action detecting section 24a and the position information detected by a position detecting section 26a.

In step S12, the avoidance position determining section 38a recognizes that an avoiding action has been performed by the first vehicle 20a, based on the detection result of the avoiding action detecting section 24a.

In step S13, the avoidance position determining section 38a determines the avoidance position 74 based on the turning position information recorded in the vehicle recording section 36a. A method of determining the avoidance position 74 is the same as the determining method in step S3 of the first embodiment.

In step S14, a control section 42a controls the inter-vehicle communication section 44a to transmit the position information indicating the avoidance position 74.

In step S15, a control section 42b of the second vehicle 20b compares the position information received by the inter-vehicle communication section 44b and position information detected by a position detecting section 26b, and determines whether or not imaging is to be performed by the second vehicle 20b. For example, the control section 42b determines imaging is to be performed when the avoidance position 74 is ahead on the road 70 where the second vehicle 20b is running, in a range within a first predetermined distance from the second vehicle 20b. Then, at a time point when the second vehicle 20b has reached the avoidance position 74 or a position a second predetermined distance before the avoidance position 74, the control section 42b controls an imaging section 22b to image the road surface. Note that in the case where, due to imaging being performed constantly or every certain period, imaging is already performed by the imaging section 22b, the control section 42b extracts an image of the avoidance position 74.

In step S16, an information processing section 40b associates the image information of the road surface of the avoidance position 74 imaged by the imaging section 22b and the position information detected by the position detecting section 26b.

In step S17, the control section 42b controls a network communication section 28b to transmit the image information of the road surface of the avoidance position 74 and the position information associated with that image information.

In step S18, the server 50 performs image analysis, based on the image information of the road surface of the avoidance position 74 transmitted from the second vehicle 20b, and specifies a kind of the abnormality. Due to this processing, the kind and position of the abnormality are specified.

3. Third Embodiment

Figure 7:
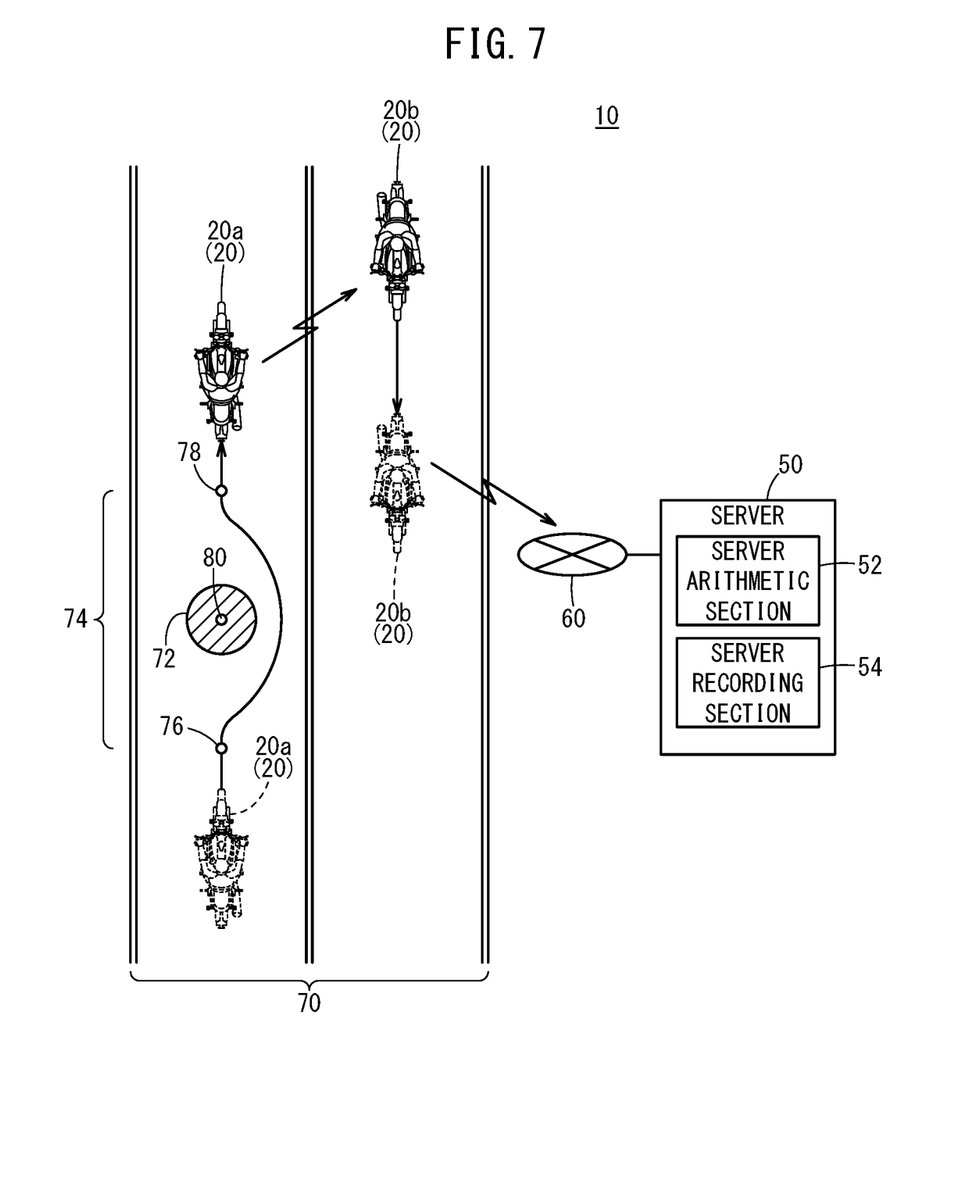
FIG. 7 is a schematic view of a road management system according to the third embodiment.

As shown in FIG. 7, in the road management system 10 according to a third embodiment, when an avoiding action has been performed by the first vehicle 20a (the first moving body) moving along the road 70, an image of the avoidance position 74 is transmitted to the server 50 from the second vehicle 20b (the second moving body) moving in an opposite direction to the first vehicle 20a and approaching the avoidance position 74. Here, a two-wheeled vehicle is assumed as the first vehicle 20a and the second vehicle 20b. However, the first vehicle 20a and the second vehicle 20b may each be a four-wheeled vehicle, not a two-wheeled vehicle. Moreover, the kind of the first vehicle 20a and the kind of the second vehicle 20b may differ. A configuration of the server 50 is the same as the configuration of the server 50 in the first and second embodiments. Moreover, configurations of the first vehicle 20a and the second vehicle 20b are the same as the configurations of the first vehicle 20a and the second vehicle 20b in the second embodiment.

Processing performed by the road management system 10 according to the third embodiment is the same as in the second embodiment. However, in step S17, the control section 42b preferably controls the network communication section 28b to add, to the image information and the position information, information indicating that the second vehicle 20b is moving in an opposite direction to a moving direction of the first vehicle 20a. This information means that the avoidance position 74 is present in a roadway on an opposite side to a roadway where the second vehicle 20b is running.

4. Fourth Embodiment

Figure 8:
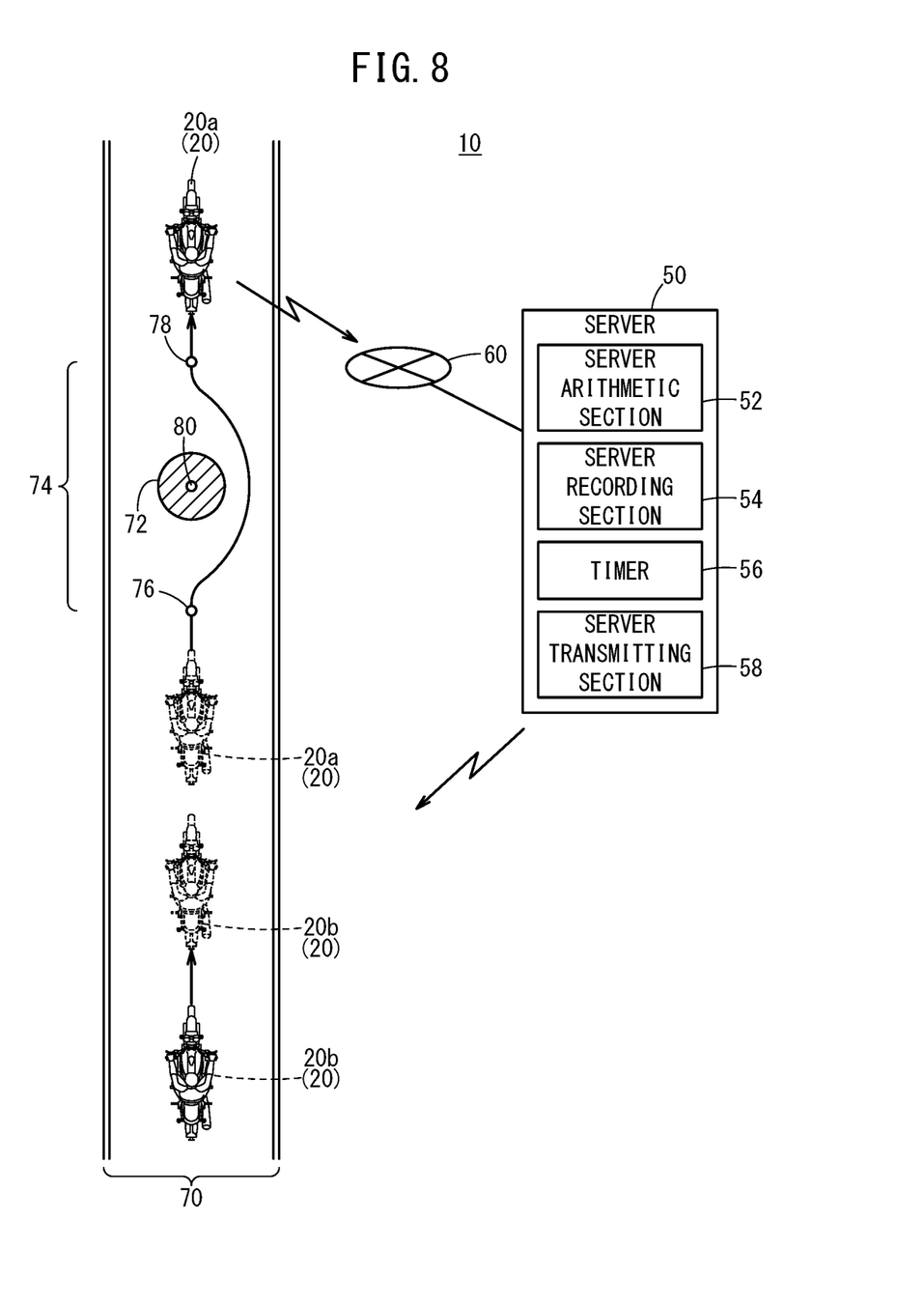
FIG. 8 is a schematic view of a road management system according to a fourth embodiment.

As shown in FIG. 8, in the road management system 10 according to a fourth embodiment, when an avoiding action has been performed by at least one first vehicle 20a (first moving body) moving along the road 70, an image of the avoidance position 74 is transmitted to the server 50 from the second vehicle 20b (the second moving body) approaching the avoidance position 74. Here, a two-wheeled vehicle is assumed as the first vehicle 20a and the second vehicle 20b. However, the first vehicle 20a and the second vehicle 20b may each be a four-wheeled vehicle, not a two-wheeled vehicle. Moreover, the kind of the first vehicle 20a and the kind of the second vehicle 20b may differ.

Figure 9:
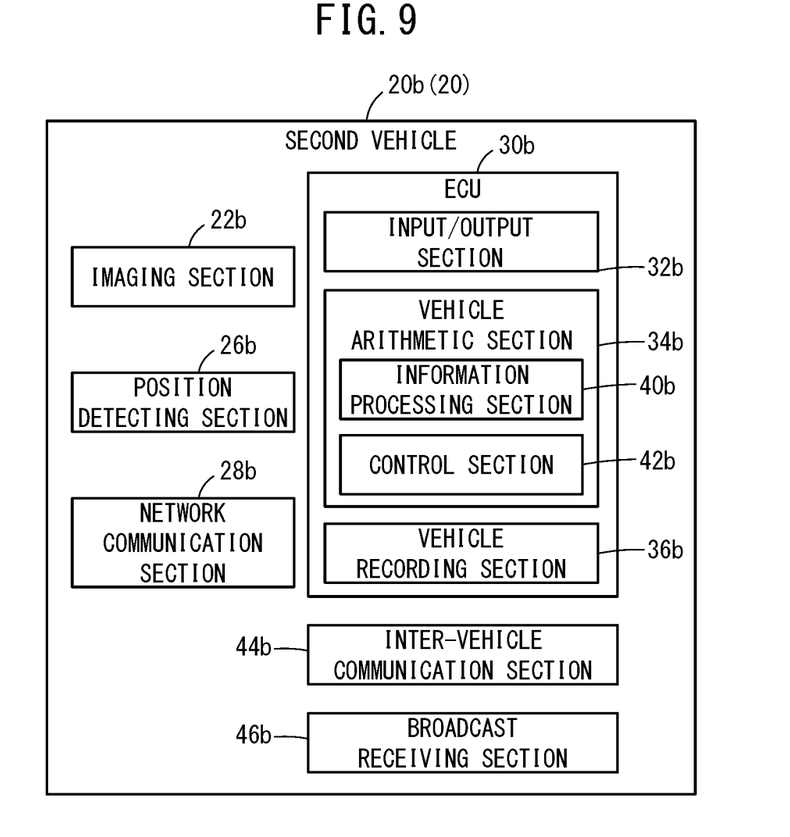
FIG. 9 is a configuration diagram of a second vehicle in the fourth embodiment.

In the fourth embodiment, the server 50 includes a timer 56 and a server transmitting section 58. The server transmitting section 58 transmits information over a broad region. Moreover, as shown in FIG. 9, the second vehicle 20b includes a broadcast receiving section 46b that receives the information transmitted from the server transmitting section 58.

[4.1 Processing]

Figure 10:
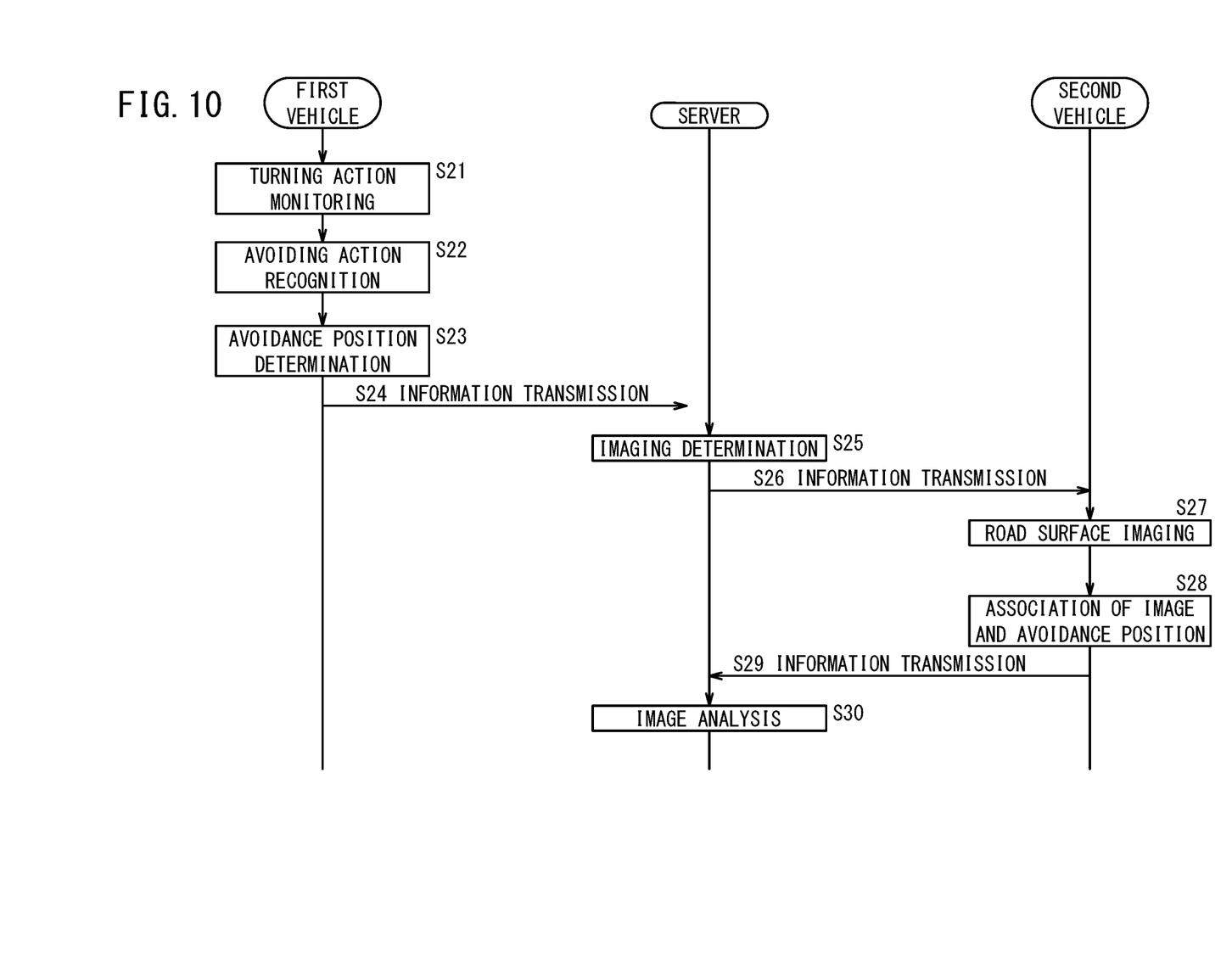
FIG. 10 is a sequence chart of the fourth embodiment.

Processing performed by the road management system 10 according to the fourth embodiment will be described using FIG. 10. The processing below is performed during running of the first vehicle 20a and the second vehicle 20b.

Processing of steps S21-S23 is the same as processing of steps S11-S13 of the second embodiment.

In step S24, the control section 42a of the first vehicle 20a controls a network communication section 28a to transmit position information indicating the avoidance position 74.

In step S25, the server arithmetic section 52 determines whether imaging is required or not. A determining method will be described below in [4.2].

If it is determined in step S25 that imaging is required, then in step S26, the server transmitting section 58 transmits the position information indicating the avoidance position 74.

In step S27, the control section 42b of the second vehicle 20b compares the position information received by the broadcast receiving section 46b and the position information detected by the position detecting section 26b, and determines whether or not imaging is to be performed by the second vehicle 20b. For example, the control section 42b determines imaging is to be performed when the avoidance position 74 is ahead on the road 70 where the second vehicle 20b is running, in a range within a first predetermined distance from the second vehicle 20b. Then, at a time point when the second vehicle 20b has reached the avoidance position 74 or a position a second predetermined distance before the avoidance position 74, the control section 42b controls the imaging section 22b to image the road surface. Note that in the case where imaging is performed constantly or every certain period by the imaging section 22b, the control section 42b extracts an image of the avoidance position 74.

Processing of steps S28-S30 is the same as processing of steps S16-S18 of the second embodiment.

[4.2 Method of Determining Whether Imaging is Required or Not]

Figure 11:
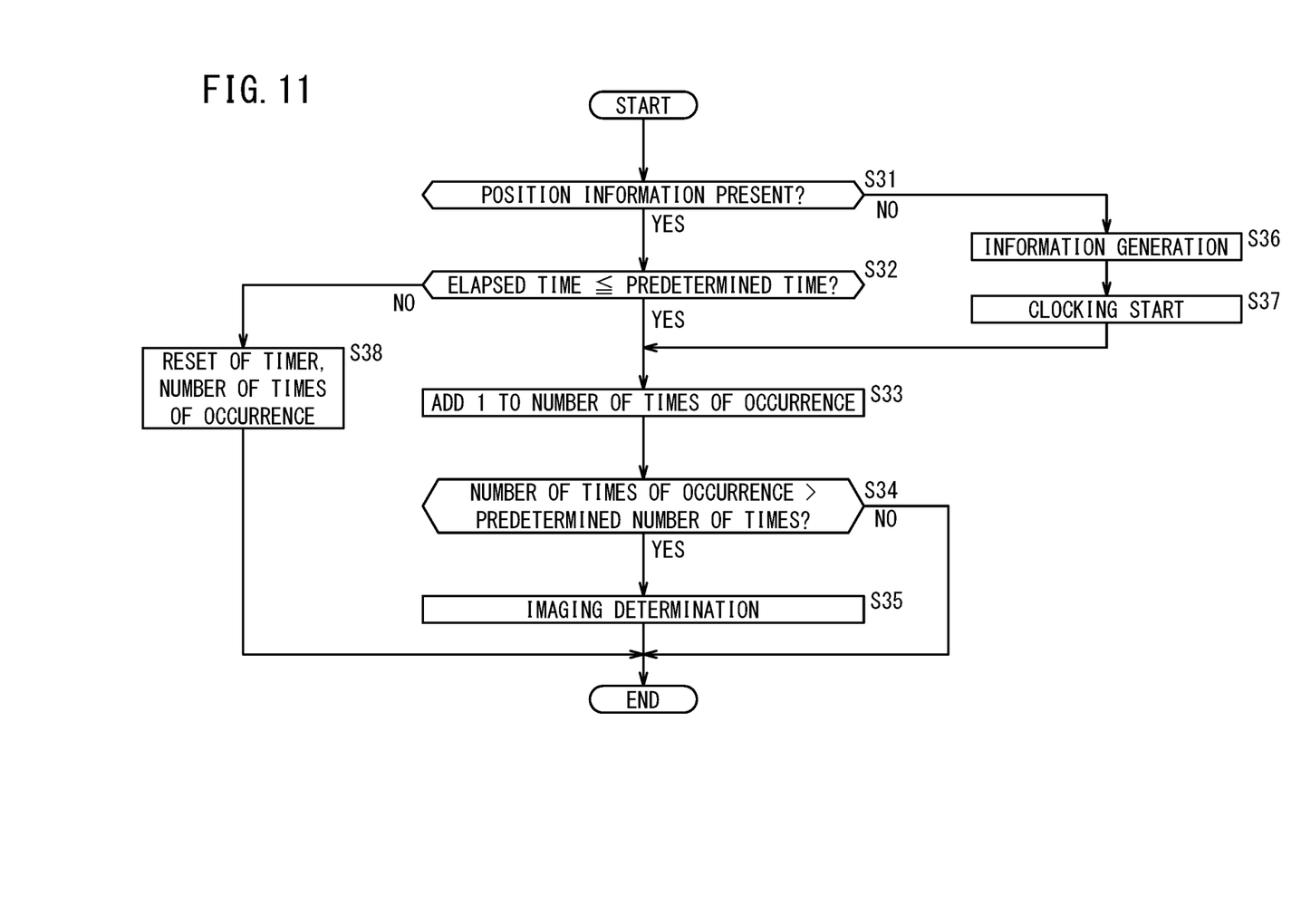
FIG. 11 is a flowchart of processing performed by a server in the fourth embodiment.

The method of determining whether imaging is required or not, performed in step S25 of FIG. 10, will be described using FIG. 11. Processing described below is performed each time the server 50 receives position information from the first vehicle 20a. Here, the avoidance position 74 and the number of times of occurrence of the avoiding action are recorded by the server recording section 54, and elapsed time with an initial avoiding action as a starting point is clocked by the timer 56.

In step S31, the server arithmetic section 52 determines whether or not position information of the avoidance position 74 is recorded in the server recording section 54. If the position information is present (step S31: YES), then processing shifts to step S32. On the other hand, if there is no position information (step S31: NO), then processing shifts to step S36.

In step S32, the server arithmetic section 52 determines whether or not the elapsed time clocked by the timer 56 is within a predetermined time. If the elapsed time is within the predetermined time (step S32: YES), then processing shifts to step S33. On the other hand, if the elapsed time exceeds the predetermined time (step S32: NO), then processing shifts to step S38.

In step S33, the server arithmetic section 52 adds 1 to the number of times of occurrence recorded in the server recording section 54. Processing shifts to step S34.

In step S34, the server arithmetic section 52 determines whether or not the number of times of occurrence exceeds a predetermined number of times. If the number of times of occurrence exceeds the predetermined number of times (step S34: YES), then processing shifts to step S35. Then, in step S35, the server arithmetic section 52 determines that imaging is required. On the other hand, if the number of times of occurrence is within the predetermined number of times (step S34: NO), then processing once ends.

In the case of processing shifting from step S31 to step S36, the server arithmetic section 52 associates the position information of the avoidance position 74 and an initial value of the number of times of occurrence, and records the associated position information and initial value in the server recording section 54. Then, in step S37, the server arithmetic section 52 activates the timer 56 to start clocking of elapsed time.

In the case of processing shifting from step S32 to step S38, the server arithmetic section 52 resets the timer 56, and sets, to an initial value, the number of times of occurrence recorded in the server recording section 54.

[4.3 Modified Example]

In the fourth embodiment, a configuration is adopted whereby the server 50 transmits position information over a broad region using the server transmitting section 58. Instead, a configuration may be adopted whereby the server 50 transmits position information to a roadside device in a periphery of the avoidance position 74, and the position information is transmitted to the second vehicle 20b from the roadside device.

5. Technical Ideas Obtained from Embodiments

Technical ideas understandable from the above-described embodiments and modified example will be described below.

An aspect of the present invention comprises:

an avoiding action detecting section 24, 24a that detects an avoiding action of a moving body (a vehicle 20, a first vehicle 20a) moving along a road 70;

a position detecting section 26, 26a that detects a position of the moving body (the vehicle 20, the first vehicle 20a);

an avoidance position determining section 38, 38a that determines an avoidance position 74 where the avoiding action has occurred, based on a detection result of the avoiding action detecting section 24, 24a and a detection result of the position detecting section 26, 26a; and an imaging section 22, 22b that images a road surface of the avoidance position 74. (All Embodiments)

Due to the above-described configuration, the road surface of the avoidance position 74 where a possibility of there being an abnormality is high is selectively imaged, hence a load of arithmetic processing to perform analysis of the road surface can be suppressed.

An aspect of the present invention may further comprise a transmitting section (an inter-vehicle communication section 44a) that transmits position information of the avoidance position 74 to a device (a second vehicle 20b) on an outside of the moving body (the first vehicle 20a), wherein the imaging section 22b may be provided in the device (the second vehicle 20b). (Second Embodiment, Third Embodiment)

The above-described configuration results in that, after the avoiding action has been performed by the moving body (the first vehicle 20a), the road surface of the avoidance position 74 can be imaged by the device (the second vehicle 20b) other than the moving body (the first vehicle 20a).

In an aspect of the present invention, the moving body may be a first moving body (the first vehicle 20a), and the device may be a second moving body (the second vehicle 20b) approaching the avoidance position 74. (Second Embodiment, Third Embodiment)

The above-described configuration results in that, after the avoiding action has been performed by the first moving body (the first vehicle 20*a*), the road surface of the avoidance position 74 can be imaged by the second moving body (the second vehicle 20*b*) approaching the avoidance position 74.

In an aspect of the present invention, the device may be the second moving body (the second vehicle 20*b*) moving in the same direction as the first moving body (the first vehicle 20*a*) and approaching the avoidance position 74. (Second Embodiment)

The above-described configuration results in that, after the avoiding action has been performed by the first moving body (the first vehicle 20*a*), the road surface of the avoidance position 74 can be imaged by the second moving body (the second vehicle 20*b*) following the first moving body (the first vehicle 20*a*).

In an aspect of the present invention, the device may be the second moving body (the second vehicle 20*b*) moving in an opposite direction to the first moving body (the first vehicle 20*a*) and approaching the avoidance position 74. (Third Embodiment)

The above-described configuration results in that, after the avoiding action has been performed by the first moving body (the first vehicle 20*a*), the road surface of the avoidance position 74 can be imaged by the second moving body (the second vehicle 20*b*) approaching from in front of the first moving body (the first vehicle 20*a*).

In an aspect of the present invention, the moving body (the vehicle 20, the first vehicle 20*a*, the second vehicle 20*b*) may be a two-wheeled vehicle.

When the moving body (the vehicle 20, the first vehicle 20*a*, the second vehicle 20*b*) is a two-wheeled vehicle as in the above-described configuration, it is easy for the avoiding action to be detected. (All Embodiments)

In an aspect of the present invention, a kind of the first moving body (the first vehicle 20*a*) may be identical to a kind of the second moving body (the second moving vehicle 20*b*). (Second Embodiment, Third Embodiment)

A possibility of the second moving body (the second vehicle 20*b*) performing the same avoiding action as the first moving body (the first vehicle 20*a*) is high. Therefore, the above-described configuration enables the image of the road surface of the avoidance position 74 to be utilized by the second moving body (the second vehicle 20*b*) too.

An aspect of the present invention may further comprise:

an information processing section 40 that associates image information of the road surface of the avoidance position 74 imaged by the imaging section 22 and position information of the avoidance position 74; and a transmitting section (a network communication section 28) that transmits, to a server 50 on an outside, the image information and the position information that have been associated, wherein the avoiding action detecting section 24, the position detecting section 26, the avoidance position determining section 38, the imaging section 22, the information processing section 40, and the transmitting section (the network communication section 28) may be provided in the moving body (the vehicle 20). (First Embodiment)

In an aspect of the present invention, a configuration may be adopted whereby in a case that, within a predetermined time, the avoiding action by a plurality of the moving bodies (the first vehicles 20*a*) has occurred in the same avoidance position 74, the imaging section 22*b* images the road surface of the avoidance position 74. (Fourth Embodiment)

The above-described configuration results in that, when the avoiding action by the plurality of moving bodies (first vehicles 20*a*) has occurred, the road surface of the avoidance position 74 is imaged, hence a road surface where there is an even higher possibility of there being an abnormality can be imaged, and wasteful imaging and image analysis can be suppressed.

Note that the road management system according to the present invention is not limited to the above-mentioned embodiments, and that, of course, a variety of configurations may be adopted without departing from the spirit of the present invention.

What is claimed is:

1. A road management system comprising a position determining device mounted on a first moving body moving along a road and an imaging device mounted on a second moving body moving along the road, the first moving body and the second moving body being provided in plural, wherein the position determining device comprises a first processor that executes first computer-readable instructions stored in a first memory, the first processor executes the first computer-readable instructions to cause the position determining device to:

determine an avoidance position where an avoiding action has occurred, based on avoidance information indicating that the first moving body has avoided an abnormality on the road and position information indicating an avoidance position of the first moving body; and externally transmit avoidance position information indicating the avoidance position through a transmitting circuit, and the imaging device comprises a second processor that executes second computer-readable instructions stored in a second memory, and the second processor executes the second computer-readable instructions to cause the imaging device to image with a camera a road surface at the avoidance position indicated by the avoidance position information received through a receiving circuit.

2. The road management system according to claim 1, wherein the second moving body moves in a same direction as the first moving body and approaches the avoidance position.

3. The road management system according to claim 1, wherein the second moving body moves in an opposite direction to the first moving body and approaches the avoidance position.

4. The road management system according to claim 1, wherein at least one of the first moving body and the second moving body is a two-wheeled vehicle.

5. The road management system according to claim 1, wherein the second processor causes the imaging device to:

associate image information of the road surface of the avoidance position imaged by the camera and the position information of the avoidance position; and transmit, through a transmitting circuit to a server on an outside, the image information and the position information that have been associated.

6. The road management system according to claim 1, wherein the transmitting circuit of the first moving body and the receiving circuit of the second moving body are configured to perform inter-vehicle communication, and the transmitting circuit of the first moving body and the receiving circuit of the second moving body perform the inter-vehicle communication to transmit and receive the avoidance position information.

7. The road management system according to claim 1, wherein the transmitting circuit of the first moving body and the receiving circuit of the second moving body are configured to perform communication with a server, the transmitting circuit of the first moving body transmits the avoidance position information to the server, and the receiving circuit of the second moving body receives the avoidance position information from the server.

8. The road management system according to claim 7, wherein in a case that, within a predetermined time, the avoiding action has been performed by more than one said first moving body in a same avoidance position, the server transmits the avoidance position information to the receiving circuit of the second moving body, and the second processor executes the second computer-readable instructions to cause the imaging device to image with the camera the road surface at the avoidance position indicated by the avoidance position information received through the receiving circuit.

\* \* \* \* \*